United States Patent [19]
Darbut et al.

[11] Patent Number: 4,887,883
[45] Date of Patent: Dec. 19, 1989

[54] UNDERSEA WET-MATEABLE FIBER OPTIC CONNECTOR

[75] Inventors: Alexander L. Darbut, Edina; Vernon C. Ralph, Brooklyn Center, both of Minn.

[73] Assignee: Honeywell Inc., Minneapolis, Minn.

[21] Appl. No.: 208,939

[22] Filed: Jun. 20, 1988

[51] Int. Cl.$^4$ .............................................. G02B 6/38
[52] U.S. Cl. ................................................. 350/96.21
[58] Field of Search ................ 350/96.20, 96.21, 96.22

[56] References Cited

U.S. PATENT DOCUMENTS

| | | | |
|---|---|---|---|
| 4,606,603 | 8/1986 | Cairns ................................ | 350/96.21 |
| 4,682,848 | 7/1987 | Cairns et al. ...................... | 350/96.21 |
| 4,696,540 | 9/1987 | Adams et al. ..................... | 350/96.21 |
| 4,733,935 | 3/1988 | Gandy ............................... | 350/96.21 |
| 4,756,595 | 7/1988 | Braun et al. ...................... | 350/96.21 |

Primary Examiner—John D. Lee
Attorney, Agent, or Firm—Roger W. Jensen

[57] ABSTRACT

A wet-mateable fiber optic connector includes mateable and demateable plug and receptacle parts having opposite end housings. The housings mount inner sleeves which interfit with one another when the connector parts are assembled together. Guide and latch fingers attached to the receptacle part facilitate interfitting of the sleeves together and latching and retaining the connector parts in mated condition. A pair of elongated wand structures mounted at outer ends to the end housings receive and hold end portions of respective optical fibers. The wand structures are mounted at inner ends to centering and sealing members in the respective inner sleeves. When the parts are mated together, one of the centering and sealing members mounts in axially aligned and a butting relation respective inner ends of the wand structures and positions in axially aligned and optically coupled relation the respective ends of the optical fiber end portions extending through the wand structures. Pressure compensating bladders in the respective inner sleeves contain an index matching fluid about inner end portions of the wand structures and inner ends of the optical fibers for equalizing the pressure of the index matching fluid therein with that of a fluid of the environment in which the mated connector will be submerged.

30 Claims, 3 Drawing Sheets

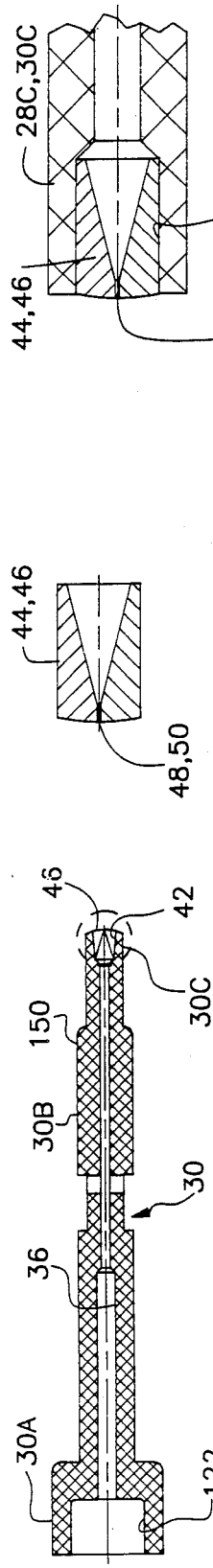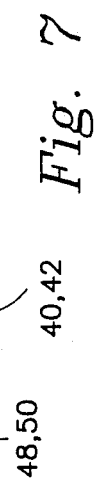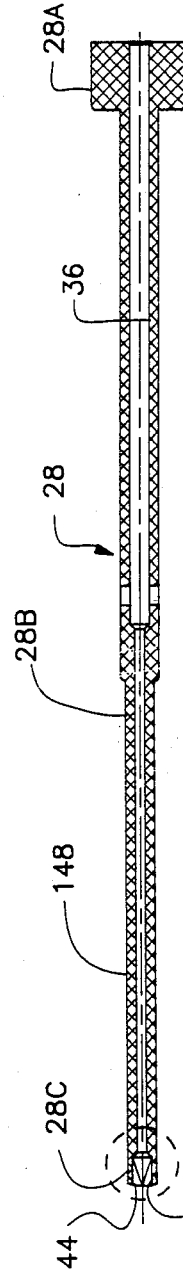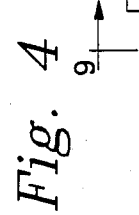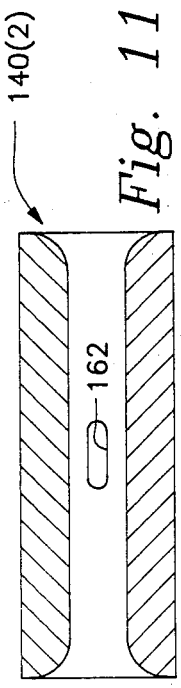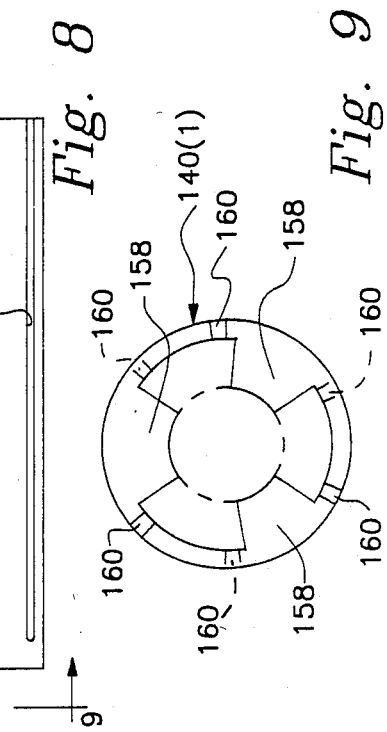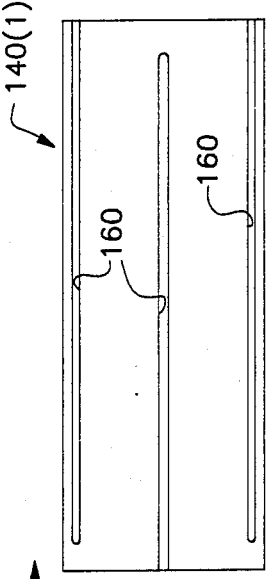

UNDERSEA WET-MATEABLE FIBER OPTIC CONNECTOR

CROSS REFERENCE TO RELATED APPLICATION

Reference is hereby made to the following copending U.S. patent application dealing with related subject matter and assigned to the same assignee of the present invention: "Optical Fiber Connector For High Pressure Environments" by S. Braun et al, assigned U.S. Ser. No. 854,224 and filed Apr. 21, 1986 now U.S. Pat. No. 4,756,595, issued July 12, 1988.

BACKGROUND OF THE INVENTION

1. Field of the Invention

The present invention generally relates to fiber optic connectors and, more particularly, is concerned with a wet-mateable connector for holding two optical fibers in optical alignment in high pressure undersea environments.

2. Description of the Prior Art

Fiberoptic (light wave) technology, a spin-off from the telecommunications industry, is being applied to terrestrial and undersea systems, both commercial and military. Undersea military surveillance systems depend increasingly on this technology for data communications. Inherent advantages of fiberoptics that make light-wave systems invaluable to the military are enhanced data security, immunity to electro-magnetic interference, low optical loss, high data speeds, low bit error rates, lightweight and radiation hardened.

However, the reliability of such systems rests largely on the design of the fiber optic connectors. The challenge in implementing undersea light-wave technology is to produce a low-cost, reliable, wet-mateable connector for undersea fiberoptics. Such a connector must join together two single-mode optical fibers, each with very small diameters, in a harsh seawater environment. A typical single-mode fiber has an optical core diameter of five to ten microns (one-tenth the diameter of a human hair). Mechanical misalignment of only one micron between the optical cores results in a twenty percent (approximately one decibel) loss in optical power.

Some of the performance objectives for a fiber optic wet-mateable connector are that the connector compensate automatically for undersea pressure, have a significant life span, align the optical cores with low loss, and be capable of undergoing several cycles of mating and demating at considerable depths using a robot or remote-controlled vehicle. For example, a connector imposing a loss of less than one-half decibel, having a life greater than two years and being capable of ten mate and demate cycles in sea water at water depths up to 20,000 feet using a remote controlled vehicle would satisfy the aforementioned performance objectives.

At the present time, it is believed that there are no undersea wet-mateable fiber optic connectors capable of meeting the above-mentioned performance objectives. Therefore, a need still exists for a connector design with the potential to reach these objectives if advanced undersea fiberoptic systems are to become a reality.

SUMMARY OF THE INVENTION

The present invention provides a wet-mateable fiber optic connector designed to satisfy the above-mentioned needs. The connector of the present invention has a construction which enhances the likelihood of this connector design achieving the aforementioned performance objectives.

Accordingly, the present invention relates to a fiber optic connector which basically comprises first and second mateable and demateable connector parts.

The first mateable and demateable part of the connector includes a first housing portion and an actuatable latch means mounted to the first housing portion for movement between latching and unlatching positions. A first wand structure for receiving and holding a first optical fiber end portion is stationarily mounted at its outer end portion to the first housing portion.

The first connector part also includes first sealing and centering means and first compensating means. The first sealing and centering means which slidably receives and holds an inner end portion of the first wand structure is mounted to the first housing portion. The first compensating means connected to the sealing and centering means sealably contains an optical refractive index matching fluid about the inner end portion of the first wand structure and equalizes the pressure of the index matching fluid therein with a fluid of the environment in which the connector will be submerged.

The second mateable and demateable part of the connector includes a second housing portion partially interfitted within the first housing portion of the first part when the connector parts are in a mated condition, and means on the second housing portion being cooperable with the first housing portion for guiding the second housing portion into the mated condition with the first housing portion and for releasably latching the housing portions together to retain the parts in the mated condition. A second wand structure for receiving and holding a second optical fiber end portion is mounted at its outer end portion to the second housing portion.

The second connector part also includes second sealing and centering means and second compensating means. The second sealing and centering means mounted to the second housing portion receives and holds an inner end portion of the second wand structure and receives the inner end portion of the first wand structure so as to mount in axially aligned and abutting relation respective inner ends of the first and second wand structures and position in axially aligned and optically coupled relation respective ends of the first and second optical fiber end portions extending through the wand structures when the parts are brought into the mated condition. The second compensating means extends and is connected between the second housing portion and the sealing and centering means for sealably containing an optical refractive index matching fluid about the inner end portion of the second wand structure, the abutting inner ends of the wand structures and the optically coupled optical fiber end portions and for equalizing the pressure of the index matching fluid therein with the environmental fluid in which the connector will be submerged.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is a longitudinal axial sectional view of a stationary wand structure being an alternative to the wand structure shown in the plug part of FIG. 2.

FIG. 5 is a longitudinal axial sectional view of a movable wand structure being an alternative to the wand structure shown in the receptacle part of FIG. 3.

FIG. 6 is an enlarged longitudinal axial sectional view of an insert provided in the inner ends of each of the wand structures of FIGS. 4 and 5.

FIG. 7 is an enlarged view of the circled portion of the each of the inner ends of the wand structures of FIGS. 4 and 5.

FIG. 8 is a side elevational view of an alignment sleeve being an alternative to the sleeve shown in the connector of FIG. 1.

FIG. 9 is an end elevational view of the sleeve as seen along line 9—9 of FIG. 8.

FIG. 10 is an enlarged view of the circled portions of the inner ends of the wand structures of FIGS. 4 and 5 being coupled in alignment by the sleeve of FIG. 8 or FIG. 11.

FIG. 11 is a longitudinal axial view of another alignment sleeve being an alternative to the sleeve shown in the connector of FIG. 1 and also to the sleeve of FIG. 8.

DETAILED DESCRIPTION OF THE INVENTION

Figure 1:
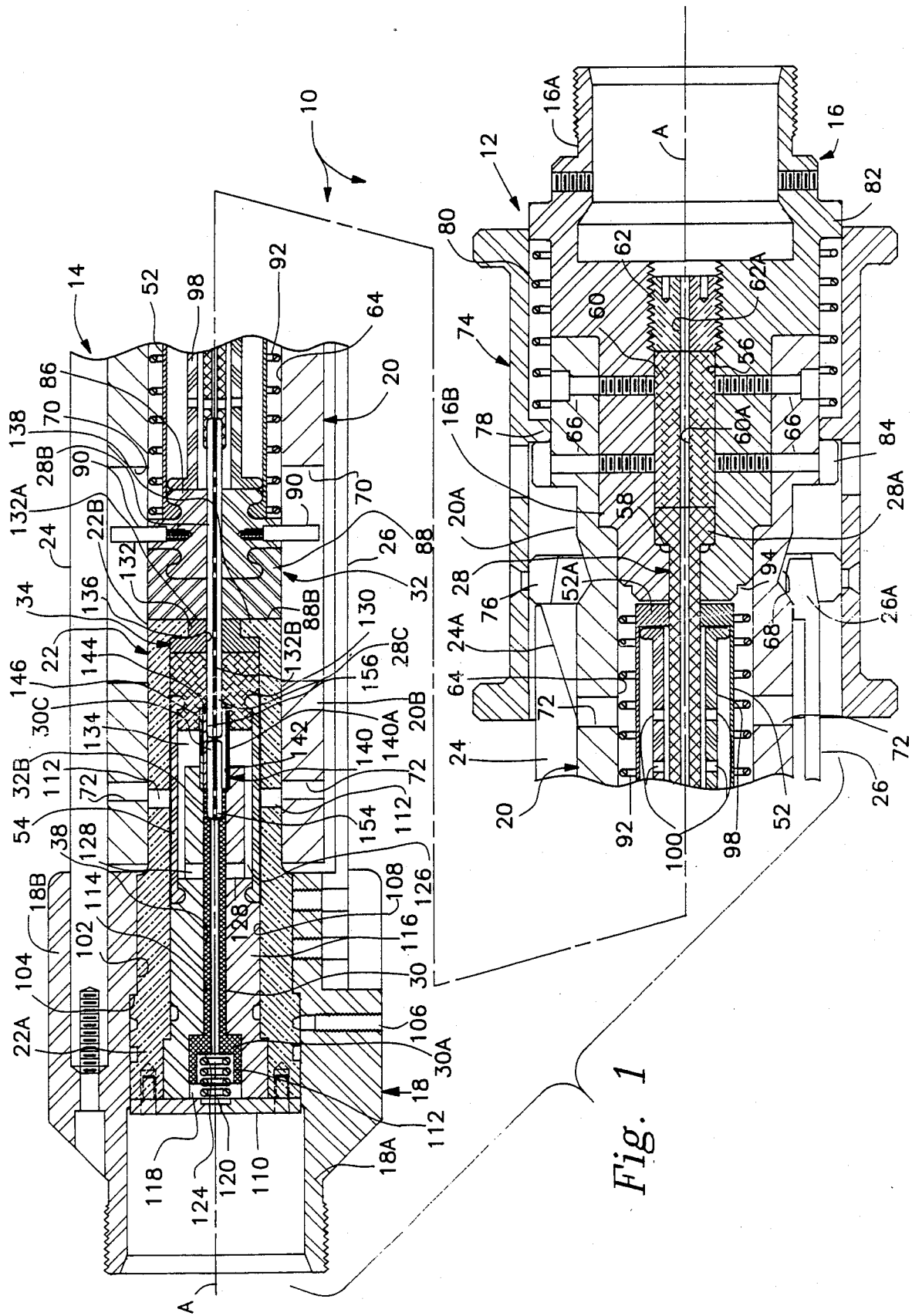
FIG. 1 is a longitudinal axial sectional view of a wet-mateable fiber optic connector of the present invention illustrating mateable and demateable receptacle and plug parts of the connector mated together.
Figure 3:
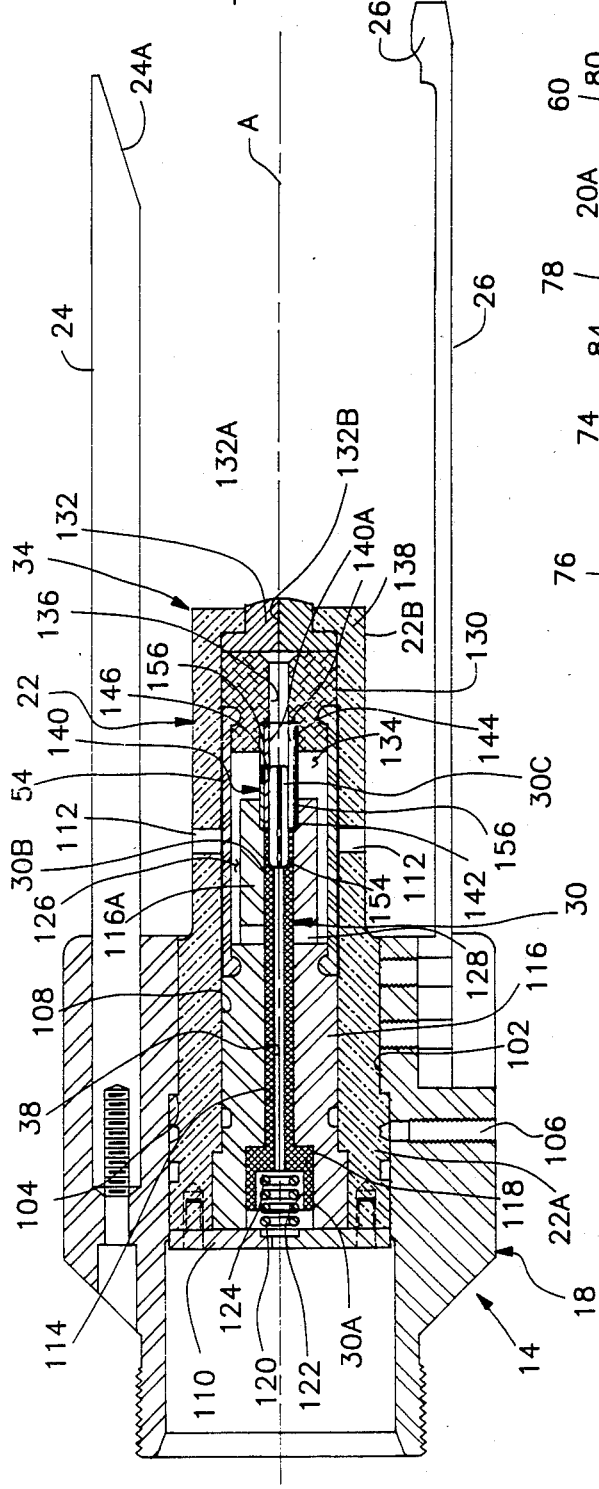
FIG. 3 is a longitudinal axial sectional view of the receptacle part of the connector of FIG. 1 by itself.
Figure 2:
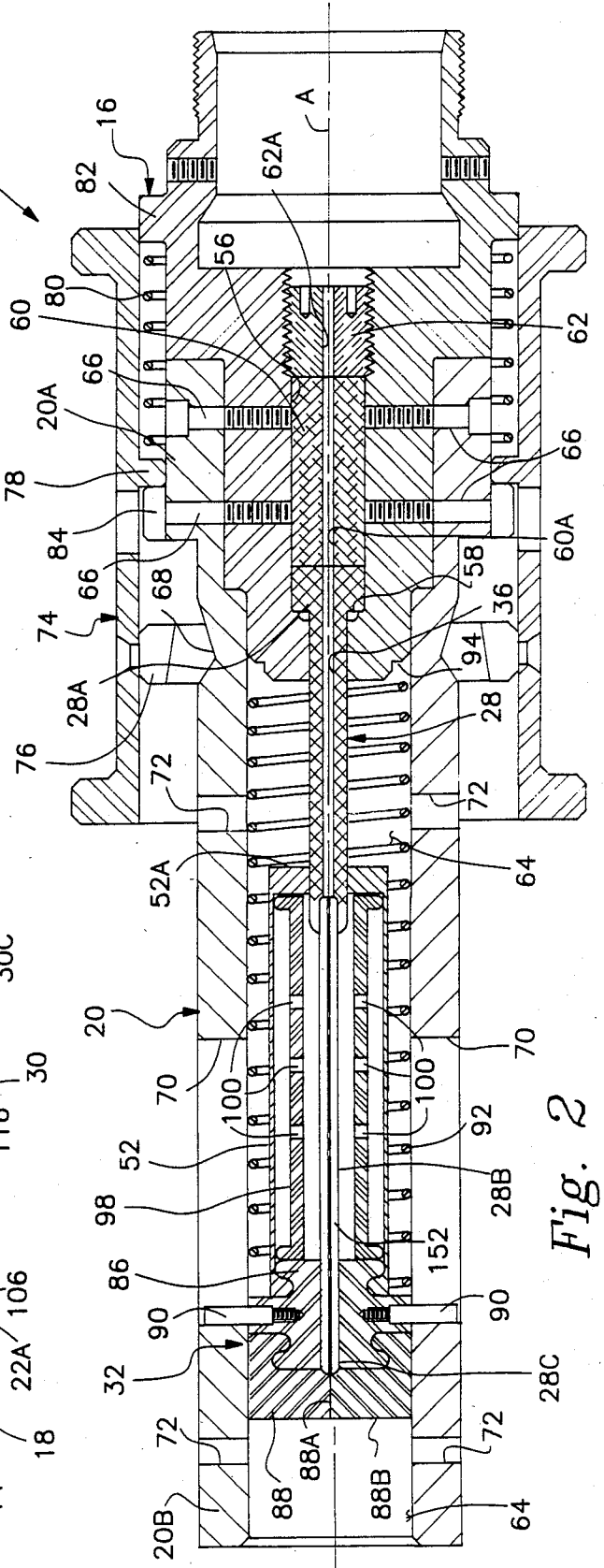
FIG. 2 is a longitudinal axial sectional view of the plug part of the connector of FIG. 1 by itself.

Referring now to the drawings, and particularly to FIGS. 1 to 3, there is shown a wet-mateable fiber optic connector, generally designated by the number 10 and constructed in accordance with the principles of the present invention, being particularly adapted for use in a high pressure, deep undersea environment. As depicted in FIGS. 2 and 3, the connector 10 includes mateable and demateable plug and receptacle parts 12, 14, the parts being shown unmated and separately in FIGS. 2 and 3 and mated together in FIG. 1.

The mateable and demateable connector plug and receptacle parts 12, 14 respectively include a pair of opposite outer end housings 16, 18 and a pair of elongated hollow inner end sleeves 20, 22 attached at their outer ends 20A, 22A to the respective outer housings 16, 18. When the connector parts 12, 14 are in mated condition, the receptacle part inner sleeve 22 is interfitted within the plug part inner sleeve 20. Also, the receptacle part 14 includes a plurality of elongated guide and latch fingers 24, 26 attached in alternating fashion at outer ends thereof to the outer end housing 18 thereof. The fingers 24, 26 are adapted to guide interfitting and perform latching of the inner sleeves 20, 22 together. In the illustrated embodiment, there are three guide fingers 24 and three latch fingers circumferentially spaced apart by one hundred twenty degrees.

The mateable and demateable connector plug and receptacle parts 12, 14 also respectively include a pair of elongated stationary and movable wand structures 28, 30 mounted at their outer ends 28A, 30A by the respective outer housings 16, 18 for receiving and stationarily holding therein end portions of respective optical fibers F (see FIG. 10) along the longitudinal axes A of the plug and receptacle parts 12, 14. Further, a pair of centering means 32, 34 are mounted in the respective inner sleeves 20, 22 at respective inner ends 20B, 22B thereof. The centering means 32, 34 are adapted to mount the respective wand structures 28, 30 at their inner end portions 28B, 30B.

As depicted clearly in FIG. 1, the one center and sealing means 34 in the connector receptacle part 14 also mounts the inner end portion 28B of the stationary wand structure 28 when the inner sleeves 20, 22 of the connector parts 12, 14 are interfitted together. Specifically, as seen generally in FIG. 1 and in detail in FIG. 10 (although slightly different versions of the wand structures are illustrated in FIGS. 1 and 10) the respective inner ends 28C, 30C of the wand structures 28, 30 are mounted in axially aligned and abutting relation and the respective core ends C of the optical fiber end portions F which extend through the wand structures 28, 30 are positioned in axially aligned and optically coupled relation.

As seen in FIGS. 5 to 10, the wand structures 28, 30 have respective axial channels 36, 38 defined therethrough for receiving and positioning therein the respective optical fiber end portions F. Further, the wand structures 28, 30 have respective recesses 40, 42 defined in their inner ends 28C, 30C which communicate the channels 36, 38 with the exterior of the wand structures 28, 30. Tapered inserts 44, 46 composed of sapphire or ceramic material and having central bores 48, 50 therethrough, are tightly frictionally fitted within the wand structure inner end recesses 40, 42. The inserts 44, 46 receive and hold therein the ends of the cladded optical fiber core C of the buffered optical fibers F in stationary position relative to the respective wand structure 28, 30.

Further, the mateable and demateable connector plug and receptacle parts 12, 14 respectively include a pair of pressure compensating means in the form of bladders 52, 54. The bladders 52, 54 are mounted in the respective inner sleeves 20, 22 of the connector parts 12, 14 and contain an optical refractive index fluid which matches that of the optical fiber cladding core C. The index matching fluid is contained about inner end portions 28B, 30B of the wand structures 28, 30 and inner ends of the optical fiber cladding cores C. The bladders 52, 54 are composed of yieldably resilient flexible material and through contact at their exteriors with the fluid of the environment in which the connector 10 will be submerged during use, the bladders 52, 54 are capable of equalizing the pressure of the index matching fluid therein with that of the environmental fluid.

More particularly, referring to FIGS. 1 and 2, the plug part outer end housing 16 has an outer hollow threaded end 16A and an axial bore 56 defined therethrough with an annular shoulder 58 defined therein. The stationary wand structure 28 is received in the housing bore 56 with its enlarged diameter outer end 28A clamped in abutting relation against the annular internal shoulder 58 of the housing 16 by spacing means installed in the housing 16 in the form of an inner cylindrical spacer 60 and an outer cylindrical externally-threaded bushing 62 which is threaded into internal threads in the outer end of the bore 56. The spacer 60 and bushing 62 have respective aligned axial passages 60A, 62A defined therethrough in alignment with the axial channel 36 through the wand structure 28 for receiving therethrough the optical fiber end portion F (FIG. 10) along the axis A of the connector 10. The spacer and bushing passages 60A, 62A are potted with a sealing material about the end portion of the optical fiber extending therethrough.

The plug part inner sleeve 20 extends axially from the outer housing 16 so as to define an interior chamber 64 open at the inner end 20B of the sleeve 20. The inner sleeve 20 at its outer end 20A fits over a reduced diameter inner end 16B of the outer housing 16 and is attached thereto by bolts 66. The inner sleeve 20 has an annular exterior latching groove 68 defined circumferentially about its outer end 20A. Also, the sleeve 20 has a plurality of circumferentially spaced elongated slots 70 and radial holes 72 defined therethrough (preferably four each in number and displaced approximately ninety degrees apart) between its outer and inner ends 20A, 20B which communicate its interior chamber 64 with the exterior of the sleeve 20 and thereby with the fluid of the environment in which the connector will be used.

The connector plug part 12 also includes an actuatable latch means in the form of a cylindrical collar 74 which extends axially over adjacent attached ends of the outer housing 16 and inner sleeve 20. The latch collar 74 internally mounts a latch ring 76 and has a middle internal flange 78. A coiled spring 80 is captured in a state of compression between an outer flange 82 on the outer end 16A of the housing 16 and the internal flange 78 of the latch collar 74 so as to bias the collar 74 to move toward a stop ring 84 fastened around the outer end 20A of the inner sleeve 20.

When the internal flange 78 of the latch collar 74 abuts against the stop ring 84 on the inner sleeve 20, the collar 74 is then at a latching position wherein its latch ring 76 overlies the latching groove 68 in the exterior surface of the inner sleeve 20. As can be seen in FIG. 1, when the latching ends 26A of the latch fingers 24 on the receptacle part 14 are mated with the latching groove 68, the presence of the latch ring 76 overlying the latch finger ends 26A prevents them from unmating from the latching groove 68 which is necessary in order to pull apart the inner sleeves 20, 22 of the plug and receptacle parts 12, 14.

On the other hand, when the latch collar 74 is moved against the yieldable bias of the spring 80 and away from the stop ring 84, the latch ring 76 is displaced from the latching position and the latch collar 74 is thereby displaced to an unlatching position so that the latch finger ends 26A are now uncovered. Then, upon application of opposite axial forces on the mated connector parts 12, 14 to pull them apart, the tapered configurations of the finger ends 26A and latching groove 68 promote outward flexing of the fingers 26 and unmating of the finger ends from the groove to allow unmating of the connector parts 12, 14.

The plug part sealing and centering means 32 which slidably receives and holds the inner end portion 28B of stationary wand structure 28 is composed of cylindrical centering and sealing members 86, 88. The centering member 86 has circumferentially spaced and mounted pins 90, preferably four in number and displaced ninety degrees apart, which project radially into the axial slots 70 in the inner sleeve 20 for mounting the centering member 86 for axial sliding movement along the interior channel 64 of the inner sleeve 20. A coiled spring 92 is captured in a state of compression between the centering member 86 and an annular recessed shoulder 94 in the inner end 16A of the outer housing 16 so as to bias the centering member 86 to move toward the sleeve inner end 20B until the guide pins 90 abut the ends of the slots 70. The centering member 86 has an axial bore A defined therethrough for slidably movably mounting therethrough the inner end portion 28B of the stationary wand structure 28.

The sealing member 88 of the centering and sealing means 32 is composed of a yieldably resilient material, such as an elastomer, and is attached to an inner side of the centering member 86 for movement therewith along the interior chamber 64 of the inner sleeve 20. The sealing member 88 provides a sliding seal with the interior surface of the inner sleeve 20 about the exterior of the sealing member 88. The sealing member 88 has an axial opening 88A defined therethrough which is biased closed. However, due to its resiliently yieldable nature, the sealing member 88 will stretch at its opening 88A allowing extension and movement therethrough of the inner end portion 28B of the wand structure 28 as the centering and sealing members 86, 88 move axially along the chamber 64 of the inner sleeve 20. However, the sealing member 88 provides a sliding seal with the wand structure 28 at the interior of the sealing member 88. The exterior and interior sliding seals provided by the sealing member 88 prevent access by environmental fluid through the open inner end 20B of the inner sleeve 20 past the sealing member 88 and to the centering member 86 and thereby to the axial bore 86A therethrough.

The elongated pressure compensating bladder 52 of the plug part 12 encompassing the inner end portion 28B of the stationary wand structure 28 is attached to an outer side of the centering member 86 so as to extend axially within the interior chamber 64 of the inner sleeve 20 and be movable with the centering member 86 therealong. The bladder 52 is provided with an elongated internal support 98 which extends between an outer end 52A of the bladder and the outer side of the centering member 86. The support 98 has openings 100 therein allowing flow of the index matching fluid therethrough to the wand structure 28.

More particularly, referring to FIGS. 1 and 3, the receptacle part outer end housing 18 has an outer hollow threaded end 18A and an axial cavity 102 defined therethrough with an annular shoulder 104 defined therein and facing outwardly. The inner sleeve 22 is slightly larger in diameter at its outer end 22A such that it abuts the shoulder 104 and is then fixed in the cavity 102 by a set screw 106. The inner sleeve 22 extends axially from the outer housing 18, defines an interior chamber 108, is open at its inner end 22B and closed at its outer end 22A by an end plate 110 attached thereto. Also, the inner sleeve 22 has a row of circumferentially spaced openings 112 defined therethrough between its inner and outer ends 22B, 22A which communicate its interior chamber 108 with the exterior of the sleeve 22. As seen in FIG. 1, the openings 112 in the receptacle part inner sleeve 22 are aligned with one set of the holes 72 in the plug part inner sleeve 20. Thus, via the aligned openings 112 and holes 72 of the respective interfitted sleeves 22, 20, the interior chamber 108 communicates with environmental fluid in which the connector 10 is submerged during use.

It will be noted that the receptacle part guide fingers 24 extend axially along the inner sleeve 22 and are spaced outwardly therefrom by an amount slightly greater than the wall thickness of the inner sleeve 20 of the plug part 12 for allowing insertion of the latter inside of the guide fingers 24 and over the inner sleeve 22 of the receptacle part 14. The guide fingers 24 have forward tapered ends 24A which facilitate guiding of the plug part inner sleeve 20 over the receptacle part inner sleeve 22 for bringing the parts 12, 14 into mated relation with one another. When the parts are mated as seen in FIG. 1, the ends 24A of the guide fingers 24 extend between the inner end of the latch collar 74 and the plug part inner sleeve 20.

The movable wand structure 30 is received in an axial passage 114 of a cylindrical spacing member 116 being fixedly mounted in the outer portion of the interior chamber 108 of the plug part inner sleeve 20 which, in turn, is fixed in the axial cavity 102 of the outer housing 18. The spacing member 116 has an outer recess 118 which receives the enlarged diameter outer end 30A of the wand structure 30. A coiled spring 120 is disposed in the spacing member recess 118 and a recess 122 aligned therewith being defined in the outer end 30A of the wand structure. The spring 120 is captured therein in a state of compression between the end plate 110 and an interior end surface 124 in the wand structure outer end recess 122. In such state, the spring 120 biases the wand structure 30 for slidable movement away from the end plate 110 into abutment with the spacing member recess 118. On the other hand, the wand structure 30 can yieldably move toward the end plate 110 to compensate for axial thermal expansion of any of the materials making up the wand structures 28, 30 and spacing members which maintain the wand structures 28, 30 with their inner ends 28C, 30C in axially aligned and abutting relation when the connector parts 12, 14 are in mated condition.

The receptacle part spacing member 116 has an inner portion 116A of reduced diameter extending toward the inner end 22B of the inner sleeve 22. This reduced diameter inner portion 116A of the spacing member 116 defines a circumferential space 126 between it and the inner sleeve 22. The inner portion 116A has a set of radial openings 128 defined therethrough communicating the circumferential space 126 with the axial passage 114 of the spacing member 116.

Further, the sealing and centering means 34 of the receptacle part which slidably receives and holds the inner end portion 30B of the movable wand structure 30 is composed of cylindrical centering and sealing members 130, 132. The centering member 130 is stationarily disposed in the interior chamber 108 of the inner sleeVe 22 adjacent to the inner end 22B thereof and displaced from the inner portion 116A of the spacing member 116 so as to define an axial space 134 therebetween which communicates with the aforementioned circumferential space 126. Also, the centering member 130 has an axial bore 136 defined therethrough for movably receiving and mounting therethrough the inner end portion 28B of the plug part wan structure 28 when the connector parts 12, 14 are in the mated condition.

The sealing member 132 of the centering and sealing means 34 is composed of a yieldably resilient material, such as an elastomer, and is stationarily disposed in the interior chamber 108 of the inner sleeve 22 between the inner end 22B thereof and the centering member 130 so as to provide a seal with the inner sleeve 22 about the exterior of sealing member 132. The inner sleeve 22 has an interior annular flange 138 thereon defining its inner open end 22B through which a portion of the sealing member 132 projects to define a leading convex face 132A thereon adapted to engage with the leading face 88B on the other sealing member 88 when the connector parts 12, 14 are brought into the mated condition.

Further, the sealing member 132 has an axial opening 132B defined therethrough which is biased closed. However, due to its resiliently yieldable nature, the sealing member 132 will stretch at its opening 132B upon insertion therethrough of the inner end portion 28B of the plug part wand structure 28 when the parts 12, 14 are brought into the mated condition. Thus, the sealing member 132 provides a sliding seal with the wand structure 28 at the interior of the sealing member 132. The exterior and interior seals provided by the sealing member 132 prevent access by environmental fluid through the open inner end 22B of the inner sleeve 22 past the sealing member 132 and to the centering member 130 and thereby to said the axial bore 136 therethrough.

Unlike the centering and sealing means 32 of the plug part 12 of the connector 10, the centering and sealing means 34 of the receptacle part 14 also includes a hollow alignment member 140 in the interior chamber 108 of the inner sleeve 22. The alignment member 140 extends through the axial space 134 defined between the spacing member inner portion 116A and the centering member 130. The alignment member 140 is mounted at its opposite ends within recesses 142, 144 in the spacing member inner portion 116A and the centering member 130 so as to define a rigid bridge extending therebetween.

However, the purpose of the alignment member 140 is for aligning the ends of the optical fiber cladded cores C with one another. Thus, as best seen in FIG. 10, the alignment member has interior surface portions 140A which extend between its opposite ends adapting it to receive, slidably engage, and mount in axially aligned and abutting relation, the respective inner ends 28C, 30C of the wand structures 28, 30 and thereby position the ends of the optical fiber cladded cores C extending within the central bores 48, 50 of the wand structure inserts 44, 46 in axially aligned and optically coupled relation. The alignment member 140 also has openings 146 defined therethrough which communicate the axial space 134 with the ends of the optical fiber cladded cores C within the alignment sleeve 140.

The elongated pressure compensating bladder 54 in the receptacle part 14 is tubular shaped and encompasses the alignment member 140 and the abutting inner ends 28C, 30C of the wand structures 28, 30 and the optically coupled cladded cores C of the optical fibers F. The bladder 54 is attached at its opposite ends to the spacing member 116 just outwardly of the radial openings 128 therein and to the centering member 130. Thus, the bladder 54 is disposed within and extends axially through the interior chamber 108 of the inner sleeve 22. Also, the bladder 54 is spaced outwardly from the spacing member inner portion 116A, extending through the circumferential and axial spaces 126, 134 to define a sealed internal chamber containing the index matching fluid and allowing access by the index matching fluid to the axial passage 114 in the spacing member 116 via the radial openings 128 therein. The openings 146 in the alignment member 140 also allows access of the index matching fluid to the spaces surrounding the optically coupled optical fiber cladded cores C. Thus, the exterior pressure of the fluid in the environment of the connector 10 will be communicated by the flexible bladder 54 so as to equalize the pressure of the index matching fluid within the bladder with that of the environmental fluid.

It should be readily apparent that as the inner sleeves 20, 22 of the parts 12, 14 are brought together, the receptacle part sealing member 132 at its leading convex-shaped face 132A first forceably engages the leading face 88B of the plug part sealing member 88 and causes the sealing and centering means 32 of the plug part 12 to yieldably move further into the interior chamber 64 of the inner sleeve 20 from the unmated position seen in FIG. 2 to the mated position seen in FIG. 1. The concave shape of the sealing member leading face 132A causes shedding of the environmental fluid from between the sealing members 88, 132 as they press against one another and slidably displace the centering member 86, and the sealing member 88 and the bladder 52 therewith, against the bias of the coil spring 92 toward the plug part outer end housing 16.

FIGS. 4 and 5 merely illustrate wand structures 28, 30 which are modified versions of those shown in FIGS. 1 to 3 in that they include ferrule extensions 148, 150 instead of the elongated metallic or ceramic extension bodies 152, 154 in FIGS. 1 to 3.

Also three different versions of the alignment member 140 are disclosed. The first version of the member 140 in FIGS. 1 to 3 is a tubular sleeve with three axially extending and angularly displaced sapphire rods 156 attached therein for engaging the aligned wan structure inner ends. The second version of the member 140(1) in FIGS. 8 to 10 is a sleeve with three internal circumferentially displaced and axially extending lugs 158 which engage the aligned wand structure inner ends. The sleeve also has a pattern of axial slots 160 defined therein which allow passage of index matching fluid therethrough and also which give the sleeve a springiness for tightly accommodating the aligned wand structure inner ends. The third version of the member 140(2) is a hollow sleeve sized to frictionally engage the wand structure inner ends. Also, slots 162 are defined therein.

It should be readily apparent that the sealed bladders 52, 54 residing in both the plug and receptacle parts 12, 14 of the undersea connector will prevent the index matching fluid from leaking out of the connector 10 during mating and demating, and while unmated. These bladders 52, 54 and the sealinq members 88, 132 also keep the seawater and contaminants out of contact with the wand structures and optical fibers.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A wet-mateable fiber optic connector, comprising:
    (a) a first mateable and demateable connector part including (i) a first housing portion, (ii) an actuatable latch means mounted to said first housing portion for movement between latching and unlatching positions, (iii) a first wand structure for receiving and stationarily holding therein a first optical fiber end portion and being mounted at its outer end portion to said first housing portion, (iv) first sealing and centering means for slideably receiving and holding an inner end portion of said first wand structure and being mounted to said first housing portion, and (v) first compensating means connected to said sealing and centering means for sealably containing an optical refractive index matching fluid about said inner end portion of said first wand structure and for equalizing the pressure of said index matching fluid therein with a fluid of the environment in which said connector will be submerged; and
    (b) a second mateable and demateable connector part including (i) a second housing portion partially interfitted within said first housing portion of said first connector part when said parts are in a mated condition, (ii) means on said second housing portion being cooperable with said first housing portion for guiding said second housing portion into the mated condition with said first housing portion and for releasably latching said housing portions together to retain said parts in said mated condition, (iii) a second wand structure for receiving and stationarily holding therein a second optical fiber end portion and being mounted at its outer end portion to said second housing portion, (iv) second sealing and centering means mounted to said second housing portion for receiving and holding an inner end portion of said second wand structure and for receiving said inner end portion of said first wand structure to mount in axially aligned and abutting relation respective inner ends of said first and second wand structures and position in axially aligned and optically coupled relation respective ends of the first and second optical fiber end portions extending therein, without the necessity of moving either of said fiber end portions relative to said respective wand structures which stationarily hold said fiber end portions therein, when said parts are brought into said mated condition, and (v) second compensating means for sealably containing an optical refractive index matching fluid about said inner end portion of said second wand structure, said axially aligned and abutting inner ends of said wand structures and said axially aligned and optically coupled optical fiber end portions and for equalizing the pressure of said index matching fluid therein with the environmental fluid in which said connector will be submerged.

2. The connector of claim 1 wherein said first housing portion includes a first outer end housing adapted to receive axially therethrough the first optical fiber end portion.

3. The connector of claim 2 wherein said first housing portion further includes a first inner sleeve having an interior chamber and being open at an inner end and attached at an outer end to said first outer end housing so as to extend axially therefrom, said sleeve having openings defined therethrough which communicate said interior chamber thereof with the exterior of said sleeve and thereby with the environmental fluid in which said connector will be submerged.

4. The connector of claim 3 wherein said second housing portion includes a second outer end housing adapted to receive axially therethrough the second optical fiber end portion.

5. The connector of claim 4 wherein said second housing portion further includes a second inner sleeve having an interior chamber and being attached at an outer end to said second outer end housing so as to extend axially therefrom, said second inner sleeve at its inner end adapted to be fitted within said inner end of said first inner sleeve of said first connector part with said second sealing and centering means of said second connector part sealingly engaging said first sealing and centering means of said first connector pat when said parts are in said mated condition.

6. The connector of claim 4 wherein said second housing portion further includes a second inner sleeve having an interior chamber and being attached at an outer end to said second outer end housing so as to extend axially therefrom, said second inner sleeve at its inner end fitted within said inner end of said first inner sleeve of said first connector part when said connector parts are in said mated condition, said second inner sleeve having openings defined therethrough which communicate with said interior chamber thereof and align and communicate with said openings in said first inner sleeve when said connector parts are in said mated condition thereby communicating the environmental fluid in which said connector will be submerged with said interior chamber of said second inner sleeve.

7. The connector of claim 3 wherein said first sealing and centering means includes a first centering member mounted in said interior chamber of said first inner sleeve for biased axial movement toward said open inner end thereof and yieldable axial movement toward said outer end thereof, said first centering member having an axial bore defined therethrough for slidably movably mounting therethrough said inner end portion of said first wand structure.

8. The connector of claim 7 wherein said first sealing and centering means further includes a first sealing member composed of a yieldably resilient material and being attached to an inner side of said first centering member for movement therewith along said interior chamber of said inner sleeve so as to provide a sliding seal with said sleeve about the exterior of said sealing member, said first sealing member having an axial opening defined therethrough normally closed but yieldably openable upon insertion therethrough of said inner end portion of said first wand structure so as to provide a sliding seal with said wand structure at the interior of said sealing member, said exterior and interior sliding seals provided by said first sealing member being adapted to prevent access by environmental fluid through said inner open end of said first inner sleeve past said first sealing member and thus to said first centering member and thereby to said axial bore therethrough.

9. The connector of claim 8 wherein said first compensating means is a first bladder member attached to an outer side of said first centering member so as to extend axially therefrom within said interior chamber of said inner sleeve and be movable with said first centering member therealong, said first bladder member having an opening at its outer end through which is received said inner end portion of said first wand structure, said first bladder member being composed of a yieldably resilient material and defining a first sealed internal chamber with said first centering member and about said first wand structure portion which contains the optical index matching fluid therein, said first bladder member being disposed in communication with said sleeve interior chamber and thereby with the environmental fluid for equalizing the pressure of said index matching fluid within its internal chamber with that of the environmental fluid.

10. The connector of claim 2 wherein said first housing portion further includes a first inner sleeve having an interior chamber and being open at an inner end and attached at an outer end to said first outer end housing so as to extend axially therefrom, said sleeve having latching elements defined on the exterior of its said outer end.

11. The connector of claim 10 wherein said latch means is a latch collar mounted about said first outer end housing for biased axial movement toward said latching position and yieldable axial movement toward said unlatching position, said latch collar extending axially from said outer end housing along and spaced outwardly of said outer end of said first inner sleeve and said latching elements thereon.

12. The connector of claim 11 wherein said second housing portion includes a second outer end housing adapted to receive axially therethrough the second optical fiber end portion.

13. The connector of claim 12 wherein said second housing portion further includes a second inner sleeve having an interior chamber and being attached at an outer end to said second outer end housing so as to extend axially therefrom, said second inner sleeve at its inner end fitted within said inner end of said first inner sleeve of said first connector part when said parts in said mated condition.

14. The connector of claim 13 wherein said guiding and latching means of said second connector part includes a plurality of guide fingers disposed circumferentially about said second outer end housing and being attached thereto so as to extend therefrom along the axial direction of said second housing, said guide fingers being arranged and adapted to slidably receive said inner end of said first inner sleeve of said first housing portion therebetween for guiding i over said second inner sleeve of said second housing portion to facilitate mating of said first and second connector parts together.

15. The connector of claim 14 wherein said guiding and latching means further includes a plurality of latch fingers disposed circumferentially about said second outer end housing in alternating fashion with said guide fingers and being attached thereto so as to extend therefrom along the axial direction of said second housing, said latch fingers having latching elements on inner ends thereof adapted to latch with said latching elements on said outer end of said first inner sleeve of said first housing portion when said first and second connector parts are in said mated condition for thereby retaining said parts in said mated condition.

16. The connector of claim 2 wherein said first housing portion includes a first spacing member stationarily disposed in said first outer end housing and stationarily mounting said outer end portion of said first wand structure, said first spacing member having an axial passage defined therethrough for receiving therethrough the first optical fiber end portion.

17. The connector of claim 1 wherein said first and second wand structures each has an axial channel defined therethrough for receiving and stationarily positioning therein the respective one of said first and second optical fiber end portions.

18. The connector of claim 17 wherein said each wand structure has an optical fiber core holding insert fitted within said channel at said inner end portion thereof.

19. The connector of claim 1 wherein said second housing portion includes a second outer end housing adapted to receive axially therethrough the second optical fiber end portion.

20. The connector of claim 19 wherein said second housing portion further includes a second inner sleeve having an interior chamber and being open at an inner end and attached at an outer end to said second outer end housing so as to extend axially therefrom, said sleeve having openings defined therethrough between its inner and outer ends which communicate said interior chamber thereof with the exterior of said sleeve and thereby with the environmental fluid in which said connector will be submerged.

21. The connector of claim 20 wherein said guiding and latching means includes a plurality of guide fingers disposed circumferentially about said second outer end housing and being attached thereto so as to extend therefrom along the axial direction of said second housing.

22. The connector of claim 21 wherein said guiding and latching means further includes a plurality of latch fingers disposed circumferentially about said second outer end housing in alternating fashion with said guide fingers and being attached thereto so as to extend therefrom along the axial direction of said second housing, said latch fingers having latching elements on inner ends thereof.

23. The connector of claim 20 wherein said second housing portion further includes a spacing member stationarily mounted in said interior chamber of said second inner sleeve and having an axial passage defined therethrough in which is mounted said second wand structure for biased slidable movement toward said inner end thereof and yieldable slidable movement toward said outer end thereof.

24. The connector of claim 23 wherein said second spacing member also has an inner end portion of reduced diameter so as to define a circumferential space between it and said second inner sleeve, said inner end portion having radial openings defined therethrough communicating said circumferential space with said axial passage of said second spacing member.

25. The connector of claim 24 wherein said second sealing and centering means includes a second centering member stationarily disposed in said interior chamber of said second inner sleeve adjacent to said inner end thereof and displaced from said inner end portion of said second spacing member so as to define an axial space therebetween which communicates with said circumferential space, said second centering member having an axial bore defined therethrough for movably receiving and mounting therethrough said inner end portion of said first wand structure when said first and second connector parts are brought into said mated condition.

26. The connector of claim 25 wherein said second sealing and centering means further includes a second sealing member composed of a yieldably resilient material and being stationarily disposed in said interior chamber of said second inner sleeve between said inner end thereof and said second centering member so as to provide a seal with said second inner sleeve about the exterior of said sealing member, said sealing member having an axial opening defined therethrough normally closed but yieldably openable upon insertion therethrough of said inner end portion of said first wand structure so as to provide a sliding seal with said wand structure at the interior of said sealing member, said exterior and interior seals provided by said second sealing member for preventing access by environmental fluid through said inner open end of said second inner sleeve past said second sealing member and to said centering member and thereby to said axial bore therethrough.

27. The connector of claim 26 wherein said sealing and centering means further includes a hollow alignment sleeve extending through said axial space defined between and being mounted at its opposite ends to said second spacing member inner end portion and said second centering member, said alignment sleeve having interior surface portions extending between its opposite ends which receive, slidably engage, and mount in said abutting relation said respective inner ends of said first and second wand structures and position in said optically coupled relation said ends of the first and second optical fiber end portions received within said wand structures.

28. The connector of claim 27 wherein said alignment sleeve has openings defined therethrough which communicate said axial space with the ends of the optical fiber end portions within said alignment sleeve.

29. The connector of claim 28 wherein said second compensating means is a second bladder member disposed within and extending axially through said interior chamber of said second inner sleeve and being attached to and extending between said second centering member and said second spacing member along and spaced from said inner end portion thereof and through said circumferential and axial spaces and about said alignment sleeve, said second bladder member being composed of a yieldably resilient material and defining a second sealed internal chamber containing said index matching fluid, said bladder member being disposed in communication with the environmental fluid via said openings through said second inner sleeve to its interior chamber for equalizing the pressure of said index matching fluid within said second chamber with that of the environmental fluid.

30. An undersea wet-mateable fiber optic connector, comprising:
  (a) a pair of opposite outer housings;
  (b) a pair of inner sleeves attached at outer ends thereof to said respective outer housings and interfitted with one another;
  (c) a plurality of guide and latch fingers attached in alternating fashion at outer ends thereof to one of said respective outer housings and being adapted for guiding said inner sleeves into interfitted and latched relation together;
  (d) a pair of elongated wand structures mounted at outer ends to said outer housings for receiving and stationarily holding therein end portions of respective optical fibers;
  (e) a pair of centering and sealing means mounted in said respective inner sleeves at respective inner ends thereof and being adapted to mount said respective wand structures at inner end portions thereof, one of said centering and sealing means also being adapted to mount in axially aligned and abutting relation respective inner ends of the wand structure and to position in axially aligned and optically coupled relation respective ends of the optical fiber end portions extending therein, without the necessity of moving either of said fiber end portions relative to said respective wand structures which stationarily hold said fiber end portions; and
(f) a pair of pressure compensating bladders mounted in said respective inner sleeves and containing an index matching fluid about inner end portions of said wand structures and inner ends of the optical fibers for equalizing the pressure of the index matching fluid therein with that of a fluid of the environment in which the connector will be submerged.

* * * * *